United States Patent [19]

Bass

[11] 4,448,743

[45] May 15, 1984

[54] GENERATION, INSULATED CONFINEMENT, AND HEATING OF ULTRA-HIGH TEMPERATURE PLASMAS

[75] Inventor: Robert W. Bass, Provo, Utah

[73] Assignee: Applied Fusion Research Corporation, Denver, Colo.

[21] Appl. No.: 84,837

[22] Filed: Oct. 15, 1979

[51] Int. Cl.$^3$ ............................................... G21B 1/00
[52] U.S. Cl. .................................... 376/103; 376/152
[58] Field of Search ............................ 176/1, 3, 5, 9; 376/103, 104, 151, 152

[56] References Cited

U.S. PATENT DOCUMENTS 3,346,458 10/1967 Schmidt ................................. 176/1

OTHER PUBLICATIONS

Laser Plasmas and Nuclear Energy, Henrich Hora (1975) Plenum Press, pp. 31-33, 64-72.
Laser & Electro-Optik, vol. 6 (3/74), Hora, pp. 26-27.
JETP Letter, vol. 21, No. 2. (1/20/75), pp. 68-70, Basov et al.

Primary Examiner—Sal Cangialosi

[57] ABSTRACT

Improved generation, insulated confinement and heating of ultra-high temperature steady-state plasmas in such devices as the optical plasmotron of Raizer and the freely floating plasma filament of Kapitza wherein the temperature of the plasma is increased by increasing the static pressure of the ambient medium (or decreasing the frequency of the radiant energy supply) while increasing the radiant energy supply's power and wherein the relationships between the ambient pressure, the amount of initially projected ionizing energy, the focal spot radius of this initial energy, the wavelength of the radiant energy supply, the transparency of the plasma, the rate of bremmstrahlung radiation energy losses, the power of the radiant energy supply and the ratio of the static pressure increase (or frequency decrease) are so optimized as to enable attainment of plasma temperatures more than an order of magnitude greater than hitherto attainable by any process of such a type.

5 Claims, 13 Drawing Figures $(\lambda_{FIR} = r_1 \longrightarrow \lambda_{FIR} = r_2 > r_1)$

GENERATION, INSULATED CONFINEMENT, AND HEATING OF ULTRA-HIGH TEMPERATURE PLASMAS

BACKGROUND

1. Field of the Invention

This invention relates to the reaction of ultra-high temperature steady-state plasmas such as the freely floating plasma filament of Kapitza by means of which temperatures of tens of millions of degrees Kelvin have been attained and which produce measureable fluxes of thermonuclear neutrons and measureable outputs of fusion energy but which have no great practical utility unless improvements can be discovered or invented to enable an increase of the plasma temperature by at least an order of magnitude.

2. Prior Art

One approach to the creation of such plasmas is called that of the "laser spark" and may be found at length in the books of Bekefi, Hughes and Ready which are listed below at the end of the section on parameters of a complete operative embodiment. The work closest to that of the present disclosure is that of Raizer detailed in his book *Laser-Induced Discharge Phenomena*, Consultants Bureau, New York, 1977 (translated from Russian original of Nauka Press, Moscow, 1974), particularly the material dealing with Raizer's optical plasmotron.

A physically similar approach, using however microwaves instead of laser light, is that of Kapitza detailed in his Nobel Prize Acceptance Lecture (*Science*, vol. 205, Sept. 7, 1979, pp. 959-964, originally presented in Sweden, Dec. 8, 1978, and based principally upon papers published in Russian by Kapitza in 1969, 1970, and 1975 which are referenced therein). Among other things Kapitza recounts the theoretically and experimentally well-established fact that a deuterium-fueled fusion reactor would solve the world's impending energy-shortage crisis and that such a reactor would become feasible if the temperature of his plasmas could be increased by a factor of about twenty to about a billion degrees Kelvin.

Despite the potential practical importance of progress in this field, it has not been obvious how to extrapolate the results of Raizer and Kapitza by an order of magnitude to what shall be called herein the regime of ultra-high temperatures (in excess of five hundred million degrees Kelvin). Despite a decade of research at the Laboratory of which he is Director, Kapitza in December 1978 opined that further progress in this direction appears to be impossible without the introduction of two new complications (a strong magnetic field, and increase of plasma size from centimeters to meters) which decrease the feasibility of this approach to the point where expert opinion may regard it as a blind alley with no further progress possible; to quote Kapitza:" still we have some unresolved difficulties that . . . may make the whole problem insoluble . . . our thermonuclear reactor is simple . . . but practical means of its realization and size depend on . . . processes that cannot be treated on a theoretical basis alone . . . . The . . . work . . . leads to problems, the solutions of which cannot be foreseen . . . ."

Despite the pessimism of prevailing expert opinion regarding the present approach, the disclosure of the present invention shows precisely how, with great quantitative exactness, utilization of relatively inexpensive commercially available lasers and microwave generators in a straightforward manner according to the principles disclosed herein permits the production of a steady state deuterium plasma of diameter less than one centimeter and temperature exceeding 1.5 billion degrees Kelvin in a room-temperature gaseous environment at 21 atmospheres pressure.

It is well established in patent law that the failure of an inventor or discoverer to comprehend a correct scientific explanation of his invention is no bar to patentability nor to citation of his results as fully anticipatory prior art barring patentability by others. However the position of the present inventor is that, despite its admitted importance, the work of Raizer and Kapitza and related investigators is so flawed by serious failures of correct scientific interpetation of their empirical discoveries that (in the vocabulary of patent law) their publications fail to teach others how to make or use their phenomena under even slightly altered conditions, such as, for example, an extrapolation in temperature by a mere single order of magnitude, and therefore, without the presently disclosed nonobvious inventive improvements of their discoveries, their publications would never have led those of ordinary skill in the relevant arts to attainment of the presently disclosed useful accomplishments.

In fact, Raizer's publications would lead the artisan to believe that such plasmas are not even contained, but consist of continually escaping ions and electrons which are continually replaced by the ionization of new inflowing atoms. Consequently the researcher interested in high-temperature plasma confinement would have no reason to pursue Raizer's approach.

Similarly, Kapitza's initial publications denied that actual plasma confinement was taking place; he claimed that only the electrons were being confined (by a postulated double electric layer in the plasma boundary) and that the ions were continually being lost into the plasma boundary and then replaced by new ions from outside, as in Raizer's conception; in Kapitza's major publication on the theory of his phenomenon, what he postulates as a "double layer" is actually only half of a genuine double layer such as that disclosed in FIGS. 2 and 3 of the present disclosure; more specifically, Kapitza has postulated only the potential hill in FIG. 3 and not the acompanying potential valley, despite the known fact that the solution displayed in FIG. 3 corresponds to the completely rigorous exact solution of the Poisson-Boltzmann equations of plasma kinetic theory known to all plasma physicists as BGK waves after their discoverers Bernstein, Greene and Kruskal (see pages 72-88 of R. C. Davidson's book *Methods in Nonlinear Plasma Theory*, Academic Press, 1972; using the terminology that a migma is an electrically neutral collection of ions and electrons in ordered motion while in a plasma the particles are in random motion, see also the anticipation in the context of migmas rather than plasmas of P. T. Farnsworth in U.S. Pat. Nos. 3,258,402 dated June 28, 1966 and 3,386,883 dated June 4, 1968).

In his 1970 paper, Kapitza relies so heavily upon his only partially correct theory of the boundary layer that he ignores, as experimental errors or anomalies, three perfectly valid experimental evidences that his ions were at the same temperature as his electrons (namely, that fusion neutrons at the correct rate were observed, that spectroscopic evidence indicated high ion temperatures, as did the 20 kW bremmstrahlung loss appropriate to a plasma but mistakenly attributed by Kapitza to an ad hoc hypothesized "anomalous skin conductivity loss"), and concludes that while his electrons were clearly at a temperature of one million degrees Kelvin or more, his ions were cooler by a full order of magnitude. In the ensuing decade, the weight of experimental evidence has forced him to accept that some of the ions, allegedly only those in the "interior" of the plasma, far from the boundary layer, are somehow being confined by some unknown mechanism, but as recently as September, 1979 he did not accept that the ions were sufficiently well confined to reach thermal equilibrium with the electrons: "Now we can maintain . . . a . . . discharge at a pressure of 25 atmospheres and continuously maintain the electrons at a temperature of 50 million kelvins . . . we have permanently an electron gas with a record high temperature . . . . The main problem is to heat the ions to the same temperature . . . " (loc. cit. p. 963).

Consequently there can be no doubt that the researcher interested in ultrahigh-temperature plasma confinement would have no reason to pursue Kapitza's approach in unmodified form but would, like Kapitza himself, conclude that some other complications (such as a strong magnetic field) would have to be introduced before Kapitza's phenomenon could be extrapolated to ultra-high temperatures.

Accordingly, neither the publications of Raizer nor Kapitza constitute genuinely anticipatory prior art regarding the subject matter of the presently disclosed invention. In fact, the presently disclosed invention comprises a combination of known techniques to produce an unexpected result (at least, unexpected in terms of expert opinion, although the present art is known to be highly predictable when theoretical models are sufficiently complete and are used with rigor, as in the detailed proof below by means of accepted principles of theoretical physics and engineering that the presently disclosed invention is perfectly operable and can be designed to operate within a few percentage points of nominal operating parameter values).

BRIEF SUMMARY AND OBJECTS OF THE INVENTION

The present invention relates to the production and maintenance in steady state of ultra-high-temperature confined plasmas, particularly those created by full ionization of a volume of some hydrogenic gas such as deuterium. The closest prior related (but not fully anticipatory) art includes the optical plasmotron of Raizer and the freely floating plasma filament of Kapitza and, in the field of migmas rather than plasma, the Poissor of Farnsworth. In the present invention, the temperature of the plasma is increased to more than an order of magnitude greater than hitherto attainable by any process of such a type by means of increasing the static pressure of the ambient fluid medium in which the plasma floats (or by decreasing the frequency of the radiant energy supply) while increasing the power of the radiant energy supply to compensate for the increased energy losses concomitant upon increased plasma temperature. The operability of the invention is produced by a novel optimization of the relationships between the principal physical parameters characterizing the preferred embodiments of the invention.

A primary object of the present invention is the creation of an ultra-high temperature plasma by means of a novel method and apparatus.

A feature of this invention is the generation of this plasma in a condition of insulated confinement.

Another feature of this invention is the maintenance of this plasma in a steady-state condition.

Another feature of this invention is that the minimal feasible size of the plasma is less than a centimeter in diameter, while there is no constraint other than cost on the maximal feasible size.

Another feature of this invention is that it may be practiced with present commercially available lasers and microwave beam generators and requires no special developments in radiant source technology.

Another feature of this invention is its great simplicity in comparison with alternative approaches which require such complications as high magnetic fields or which involve complicated stability problems or which require mechanically complicated geometries or inconveniently high pressures or rare materials such as superconductors.

These and other objects and features of the present invention will become more fully apparent from the following description, claims and appended drawings.

BRIEF DESCRIPTION OF THE DRAWINGS

The present invention will be fully understood from the following detailed description of illustrative embodiments thereof taken in connection with the appended drawings, in which like reference characters, specified in NOMENCLATURE FOR DRAWINGS below, designate like elements throughout the several drawings. It should be noted that none of the figures are drawn to scale; for clarity of understanding, various features have been expanded or contracted in size in relation to one another, or represented by conventional symbols, as is customary in schematic drawings.

FIGS. 4–8 illustrate a preferred mode of operation referred to herein as isochoric heating.

FIGS. 9–13 illustrate another preferred mode of operation referred to herein as isobaric heating.

FIGS. 4 and 9 illustrate the step of focusing a steady-state supply laser; note that in FIG. 9 the focal spot is smaller than in FIG. 4.

FIGS. 5 and 10 illustrate the step of focusing and firing a spark laser upon a focal spot smaller than that of the supply lasers in FIGS. 4 and 9.

FIGS. 6 and 11 illustrate the expansion to equilibrium of the fully ionized laser spark after the pulse of the spark laser has terminated; the amount of energy in the spark laser pulse is selected so that the radius of the final equilibrium fireball equals (by virtue of the ambient pressure) the wavelength of the supply laser; and the density is the resonant absorption density.

FIG. 7 illustrates the step of isochoric heating, wherein the pressure of the ambient medium is increased relatively slowly, causing the temperature of the fireball to increase while its radius and volume remain constant.

FIG. 12 illustrates the step of isobaric heating, in which the ambient pressure remains constant but the wavelength of the supply laser is increased so that the resonant absorption wavelength continues to correspond to the supply laser's wavelength although the fireball is decreasing in density as its temperature increases due to energy absorption.

FIGS. 8 and 13 illustrate the step of expansion of the fireball to near transparency to the supply energy wavelength, at which point it ceases to absorb energy significantly; in this step, the energy level of the supply lasers has been augmented by the use of a microwave beam such as a Carcinotron.

Conceptually, the steps illustrated in FIGS. 4-8 are identical to those illustrated in FIGS. 9-13, except for the difference between the steps illustrated in FIGS. 7 and 12; in FIGS. 9-13 the ambient pressure remains constant while the frequency of the supply laser is tuned, but in FIGS. 4-8 the frequency of the supply laser remains constant while the ambient pressure is tuned. (This is the reverse of the known concept of determination of density of plasmas by microwave diagnostics.)

Figure 1:
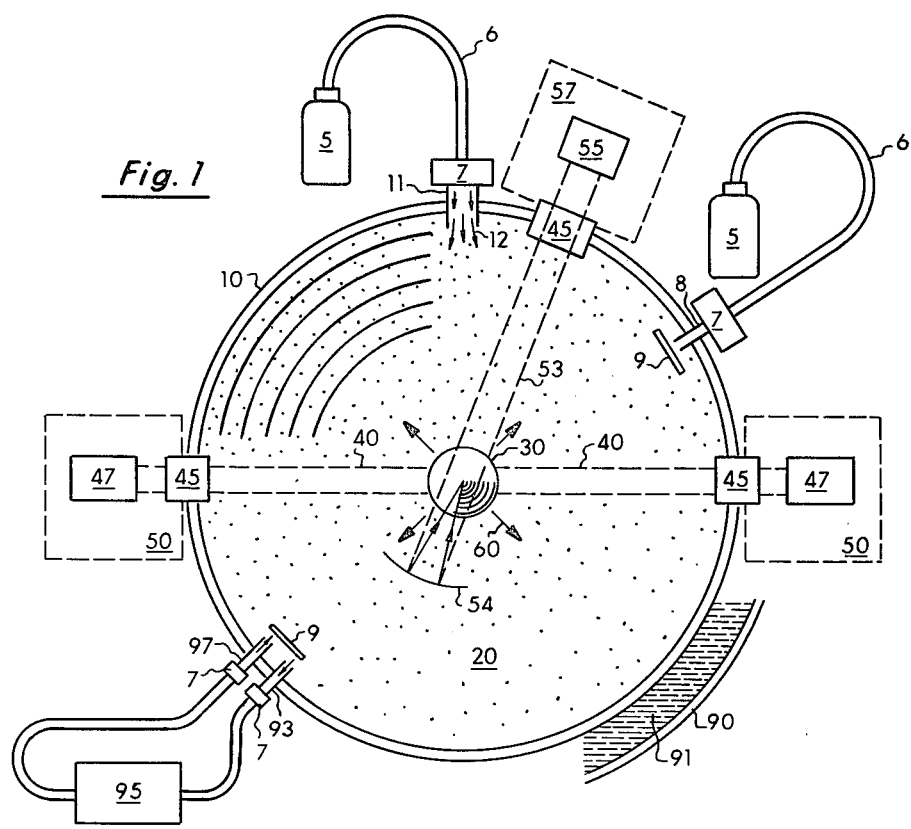
FIG. 1 is a perspective cut-away cross-sectional view of one presently preferred embodiment of this invention illustrating several elements embodying the principles of this invention and illustrating the interrelationship of the various components and elements and a physical description of the process.

The steps illustrated in FIGS. 4-8, or alternatively, in FIGS. 9—13, will not succeed unless the designed sequence of steps includes careful qunatitative optimization of the relationship between the ambient pressure, the pulsed energy, the spark focal spot radius, the supply laser wavelength, the plasma transparency, the bremmstrahlung radiation loss, the supply laser power, and the pressure increase ratio or the wavelength increase ratio. One of the novel disclosures of the present specification is a method for achieving this hitherto unknown optimization, as explained in the following section on parameters of a complete operative embodiment.

NOMENCLATURE FOR DRAWINGS

10 A high-strength hydrogenic-gas-tight hollow chamber or pressure vessel (capable of holding e.g. 25 atmospheres pressure)
5 Reservoir of high-pressure fluid medium (e.g. hydrogenic gas such as deuterium)
6 Supply means between reservoir(s) 5 and vessel 10 (e.g. feed line(s))
7 Fluid control valve(s)
8 Fluid injection means (e.g. nozzle(s))
9 Turbulence reduction means (e.g. baffle(s))
11 Bubble-centering means (e.g. down-draft vertical jet nozzle(s))
12 Bubble-centering fluid flow (e.g. jet, sized by Stokes' Law)
20 A selected high-pressure compressible fluid ambient filling medium (e.g. $H_2$ gas)
30 A selected, essentially static, internal target mass (e.g. central gas volume, or a terminal-velocity-falling pellet)
31 The fully ionized, neutral hot plasma created by explosion of 30 (e.g. a "laser spark") or expansion of 30
40 Externally generated steady-state energy beam(s) (e.g. "supply laser" light beam)
45 Entry port(s) transparent to energy beams, such as transparent to infra-red and far-infra-red radiation (e.g. Germanium or Sodium Chloride)
47 "Supply" laser(s) or maser(s) or microwave generator(s) (e.g. far-infra-red methyl fluoride laser(s) and/or O-type backward-wave oscillator(s) such as Carcinotron(s) and/or tuneable cw FIR laser(s) such as free electron laser(s))
50 Steady-state external energy injection means, including power supply for sub-means 47
53 Pulsed energy beam(s) (e.g. "spark laser" light)
54 Focusing means (e.g. plastic spherical mirror coated with aluminum)
55 Pulsed external energy beam means (e.g. Q-switched Nd-YAG "spark laser(s)")
57 Pulsed external energy injection means, including power for sub-means 55
60 Expansion of mass 30 creating plasma 31
70 Langmuir-Debye sheath or generalized Farnsworth-Kapitza effect boundary layer, including an electrostatic double layer 71, 73
71 Layer of excess negative charge [alternatively, positive]
73 Layer of excess positive charge [alternatively, negative]
80 Electrostatic potential $\Phi$ plotted as a function of radius R ("BGK waves") [alternatively, $(-\Phi)$]
90 Exterior channel(s) for cooling fluid medium circulation
91 A cooling fluid medium (e.g. water)
93 Ambient fluid egress means (e.g. nozzle(s))
95 Ambient fluid cooling-and-circulation means (e.g. pump and refrigerator)
97 Ambient fluid ingress means (e.g. nozzle(s))
100 Negative energy level
101 Trapped ion(s) (in "potential well") [alternatively, electron(s)]
110 Positive energy level
111 Trapped electron(s) [alternatively, ion(s)]

PARAMETERS OF A COMPLETE OPERATIVE EMBODIMENT

This section derives the critical design parameters for a minimal-size embodiment of the present invention known as a PLASMASPHERE, which is defined to be an 0.6 cm diameter hydrogen plasma fireball maintained in a steady state at a temperature of 130 keV (about 1.5 billion degrees Kelvin) in a room-temperature 21 atmospheres pressure hydrogen environment. The objective is to use state-of-the-art commercially available milliwatt-level far infra-red lasers and watt-level millimeter-microwave O-type backward-wave oscillators to create an ultra-high temperature confined and insulated plasma fireball of the characteristics just specified.

The derivation of the design parameters will be phrased in terms of design of an "experiment", because the performance of the indicated experiment will enable the artisan to determine empirically how close the actual physical variables will come to the nominally designed values (say whether within ten percent of nominal or within five percent of nominal); however, all of the theoretical relationships used below have been reported in the literature as having been verified repeatedly within twenty percent error or less of the predicted values, and therefore it will be evident to those skilled in this art that the predictability of the designed embodiment of the present invention lies well within the range of predictability accepted as sufficient for an allowable claim of having constructively reduced to practice a new invention.

Performance of the following demonstration "experiment" will of course constitute actual reduction to practice of the claimed invention; and all of the physical principles used in the following demonstration design derivation have been sufficiently established in terms of reliable predictability that there can be no informed doubt that the herein disclosed demonstration will operate as claimed.

DEMONSTRATION DESIGN DERIVATION

The demonstration designed herein is based on an empirical fact (if one accepts the presently proposed interpretation of prior relevant experiments in migmas by Farnsworth and in plasmas by Kapitza), or, alternatively upon a single, physically viable proposition (which can be demonstrated rigorously to be compatible with exact solutions of the Poisson-Boltzmann equations of the BGK-wave type), namely that a hot plasma fireball (at least 10 Debye lengths in diameter) in pressure equilibrium with a cold plasma envelope will spontaneously develop a self-confining and near-perfectly self-insulating boundary layer capable of maintaining a near-discontinuity in temperature (by means of a localized trapped-particle charge-separation phenomenon).

For the reader's convenience in checking our arithmetic, we have carried three and four place accuracy, but do not imply that an actual experiment would agree to more than within a few percent. (The arithmetic below was originally based on use of a methanol laser at a wavelength of 1.217 mm which in theory can product 5 mW; however, we have since learned of commercially available methyl fluoride lasers of wavelength 1.222 mm which are quaranteed to produce 2 mW; therefore we have rounded-off the far infra-red laser wavelength to 1.22 mm which may produce third-place discrepancies in the numerical results to be presented.)

I. ISOCHORIC HEATING EXAMPLE

1. Required:
   1.1 Hydrogen gas pressure vessel capable of having its contained pressure increased slowly (without turbulence) from 1.82 atmospheres pressure to 22.1 atmospheres pressure, and fitted with windows transparent to infra-red and far-infra-red radiation, and also fitted with a down-draft vertical hydrogen jet designed by Stokes' Law to prevent a lighter-than-ambient fluid "bubble" from floating upward.
   1.2 One Q-switched or chopper-pulsed Nd-YAG "spark laser" of wavelength $\lambda_p = 1.06$ $\mu$m capable of delivering a pulse of energy $E_p = 3.53$ mJ, in a ten-nanosecond or shorter interval, onto a focal spot of radius $r_o = 12.5$ $\mu$m.
   1.3 Four tetrahedrally-spaced cw FIR (Far Infra-Red) "supply lasers" of wavelength $\lambda_{FIR} = 1.22$ mm capable of delivering 1.70 mW power each and of being focused to a minimum beam radius of one wavelength ($r_1 = 1.22$ mm).
   1.4 One carcinotron (O-type backward wave oscillator) "supply microwave" capable of delivering 1.78 W power at a wavelength of 1.2 mm and of being focused to a minimum beam radius of 2.98 mm.

Figure 4:
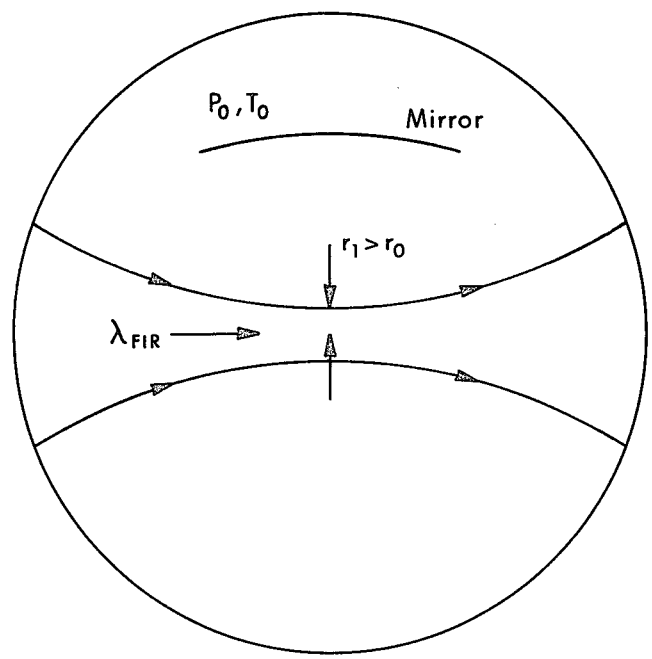
FIGS. 4–13 are a sequence of schematic drawings illustrating the sequence of steps involved in the operation of the invention and the methods of operation of the invention illustrated in FIG. 1.

2. Fill vessel with $H_2$ gas at temperature $T_o = 288.2°$ K. and an initial pressure of $p_o = 1.82$ atmospheres. Turn on supply lasers to a total power level of 6.80 mW and focus them on a central gas volume of radius 1.2 mm. (FIG. 4)

Figure 5:
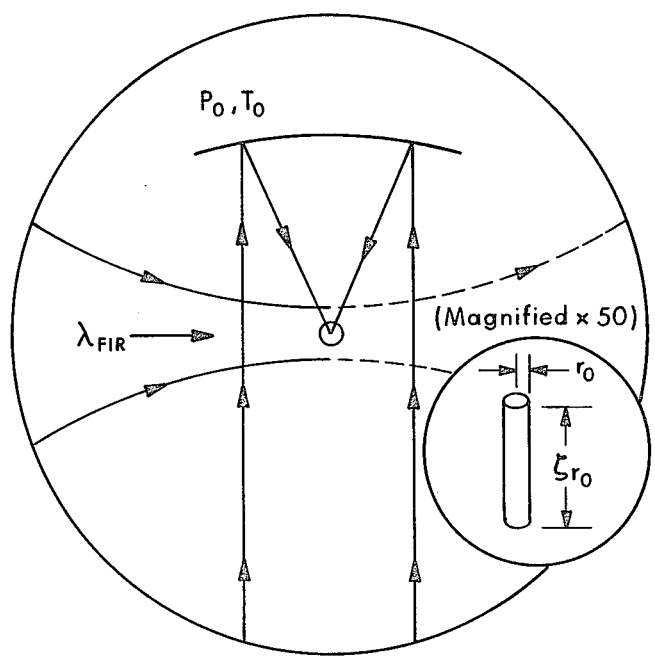

3. Focus spark laser at center of said volume and pulse $E_p = 3.53$ mJ of laser light onto its center, creating a fully ionized plasma cylinder of radius $r_o = 12.5$ $\mu$m and length about 125 $\mu$m and containing originally $2.84 \times 10^{12}$ hydrogen molecules now ionized to $5.68 \times 10^{12}$ electrons and an equal number of ions (after having absorbed 98.8% of the light and transmitted the remaining 0.04 mJ). (FIG. 5)

Figure 6:
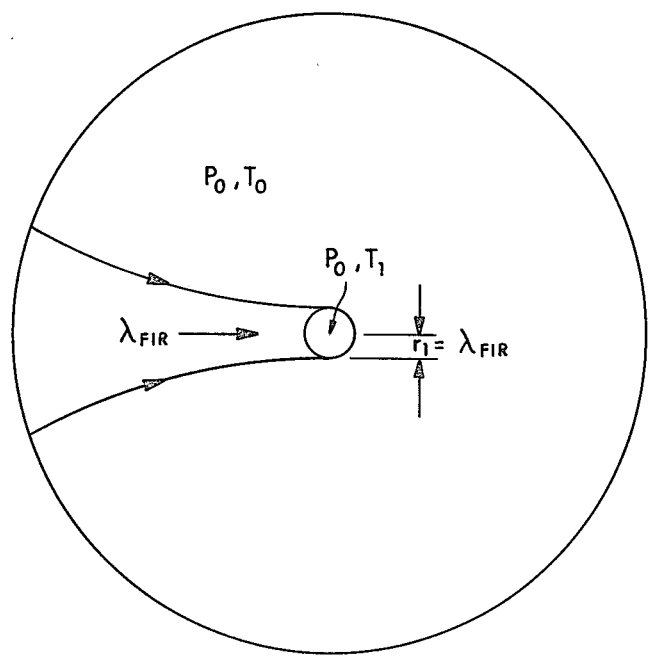

4. The plasma cylinder immediately expands to an equilibrium plasma fireball of radius $r_1 = 1.22$ mm, Debye length 7.5 $\mu$m, and a temperature of $T_1 = 8.87 \times 10^{6°}$ K. (=765 eV); the electron density is now $n_{el} = 7.52 \times 10^{14}$ cm$^{-3}$ and so the critical (resonant absorption) plasma frequency is $\nu_{cl} = 246$ GHz which (by design) corresponds perfectly to the supply laser wavelength; bremmstrahlung losses are now 2.0 mW. (FIG. 6)

Figure 7:
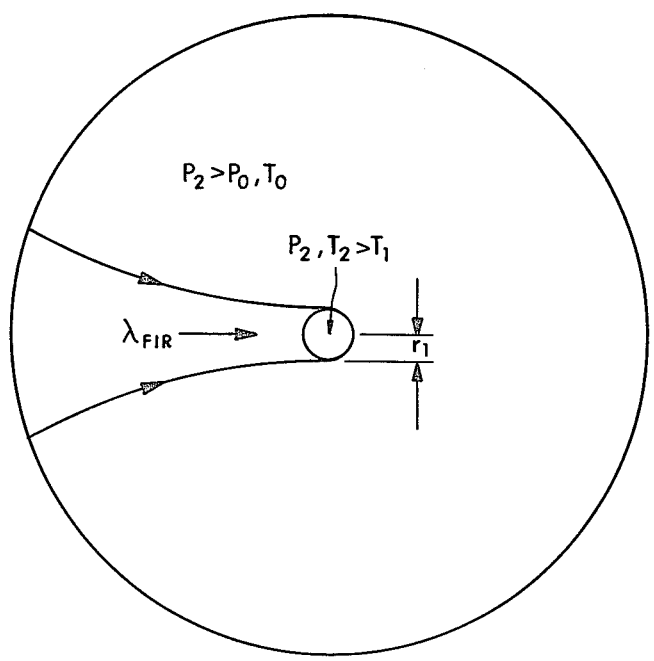

5. Isochoric Heating. Increase ambient gas pressure to its final value of $P_2 = 21.1$ atmospheres. This will increase the plasma temperature to $T_2 = 1.03 \times 10^{8°}$ K. (=8.88 keV) and increase the bremmstrahlung loss to a steady-state 6.8 mW which is (by design) compensated for perfectly by the supply lasers. (Debye length is now 25.6 $\mu$m.) (FIG. 7)

Figure 8:
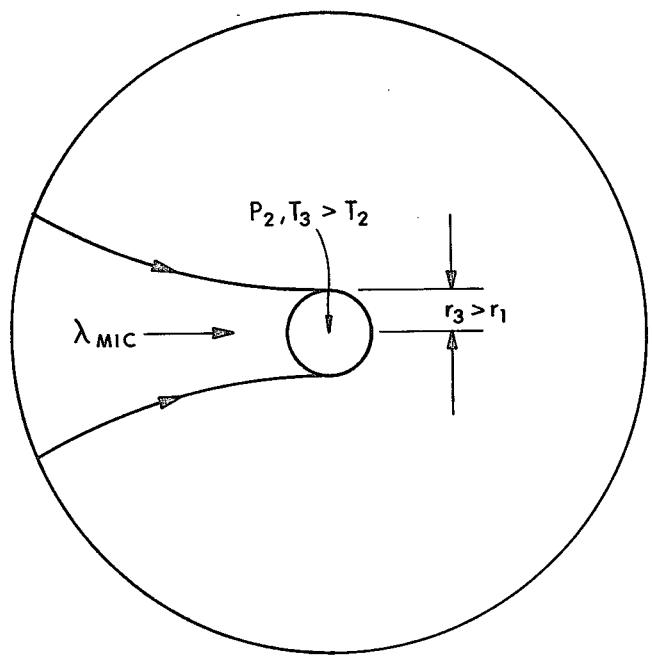

6. Turn on the supply microwave generator to a power level of 1.78 W focused on a volume of radius $r_3 = 2.98$ mm centered on the 1.2 mm radius fireball. The fireball continues to absorb energy, while heating and expanding, but less and less efficiently as its density decreases; it eventually becomes 99.9% transparent to the microwave beam after having expanded to a final radius of $r_3 = 2.98$ mm and after having been heated to a final temperature of $T_3 = 1.51 \times 10^{9°}$ K. (=130 keV); the steady state bremmstrahlung loss is finally 1.78 W which (by design) is perfectly compensated for by the supply microwave beam, the final electron density is $5.14 \times 10^{13}$ cm$^{-3}$ and the final Debye length is 0.37 mm (or less than 1/16 the fireball's diameter). (FIG. 8)

7. The result is a 6 mm diameter steady-state plasma fireball contained in 21 atmospheres pressure at 130 keV.

II. ISOBARIC HEATING EXAMPLE

Figure 9:
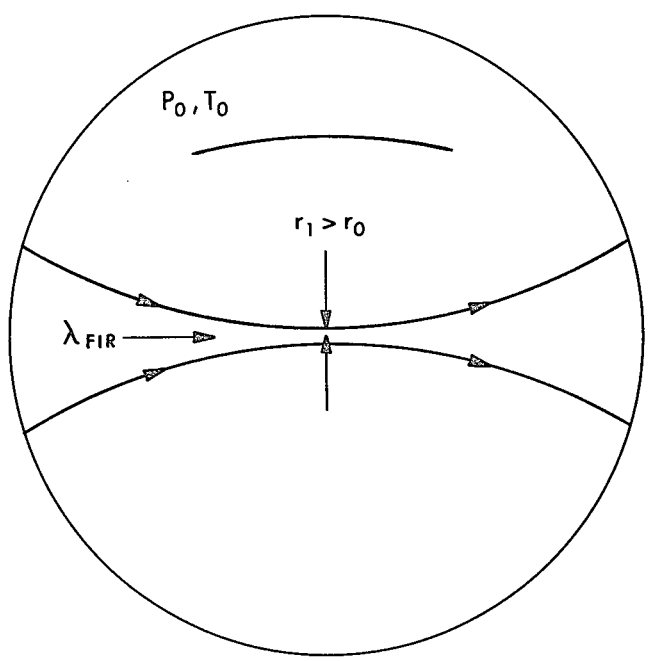

1. Required:
   1.1. As in Case I.
   1.2. As in Case I, except that now $E_p = 0.42$ mJ and $r_o = 5.52$ $\mu$m.
   1.3. Replace by a tuneable cw FIR laser, e.g. a free electron laser, capable of being tuned from a wavelength of 0.12 mm to 1.2 mm and of delivering 1.78 W power and of being throttled in power by a factor of 26.1, and of being focused to a minimum beam radius of one wavelength.
   1.4. Omit 2. Fill vessel with $H_2$ gas at room temperature ($T_o = 288.2°$ K.) and a pressure of $p_o = 21.1$ atmospheres. Turn on the supply laser at a power level of 68.0 mW and a wavelength of $\lambda = 0.122$ mm and focus it on a central gas volume of radius $r_1 = 0.262$ mm. (FIG. 9)

Figure 10:
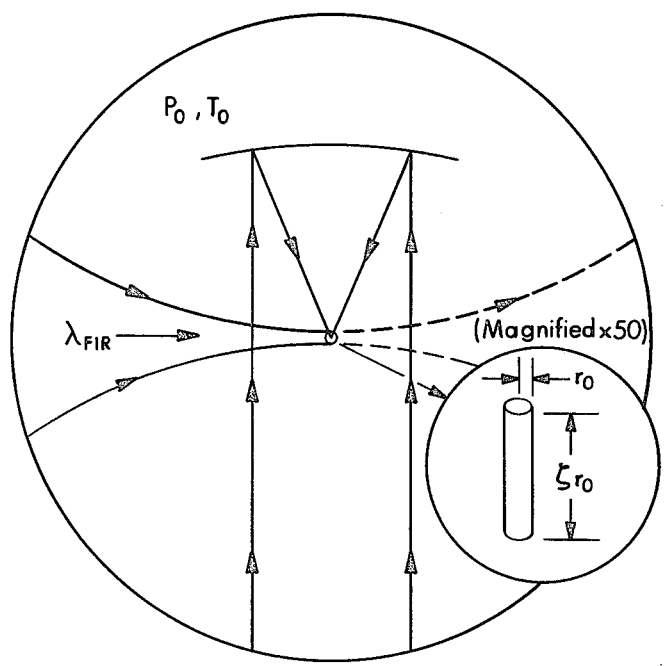

3. Focus spark laser at the center of the gas volume and pulse $E_p = 0.418$ mJ of laser light onto a focal spot of radius $r_o = 5.52$ μm at the center of said volume, creating a fully ionized plasma cylinder of radius $r_o = 5.52$ μm and length about 55.2 μm and containing originally $2.84 \times 10^{12}$ hydrogen molecules now ionized to $5.68 \times 10^{12}$ electrons and an equal number of ions. (After having absorbed virtually 100% of the 0.42 mJ of energy delivered.) (FIG. 10)

Figure 11:
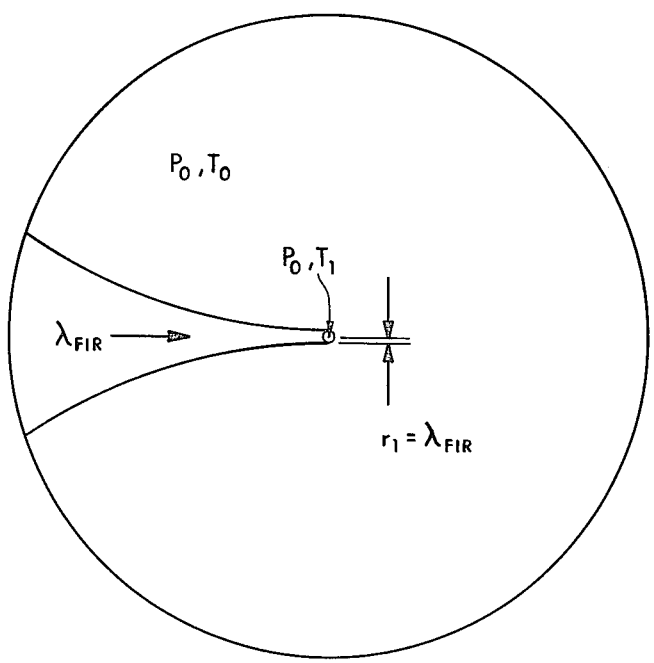

4. The plasma cylinder immediately expands to an equilibrium plasma fireball of radius $r_1 = 0.262$ mm, a Debye length of 0.26 μm, and a temperature $T_1 = 1.03 \times 10^{6°}$ K. ($= 88.8$ eV); the electron density is now $n_{el} = 7.53 \times 10^{16}$ cm$^{-3}$ and so critical (resonant absorption) plasma frequency is $\nu_{cl} = 2,464$ GHz which (by design) corresponds perfectly to the initial supply laser wavelength; the bremmstrahlung loss is now 68.0 mW, which (by design) is compensated for perfectly by the supply laser. (FIG. 11)

Figure 12:
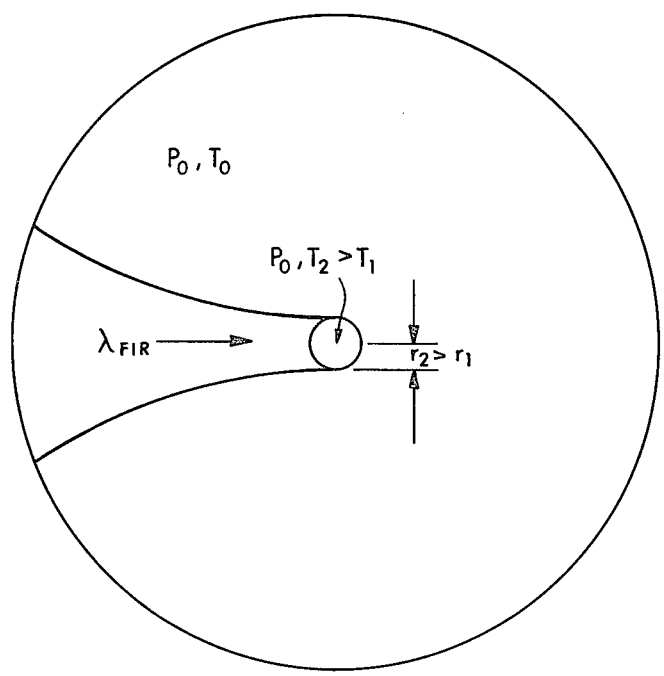

5. Isobaric Heating. Tune the supply laser from 2,464 GHz to 246 GHz, i.e. increase its wavelength from $\lambda = 0.122$ mm to $\lambda_{FIR} = 1.22$ mm; this increase the plasma fireball's temperature to $T_2 = 1.03 \times 10^{8°}$ K. ($= 8.88$ keV) while increasing its radius to $r_2 = 1.22$ mm (and decreasing the bremmstrahlung loss to 6.80 mW). (FIG. 12)

Figure 13:
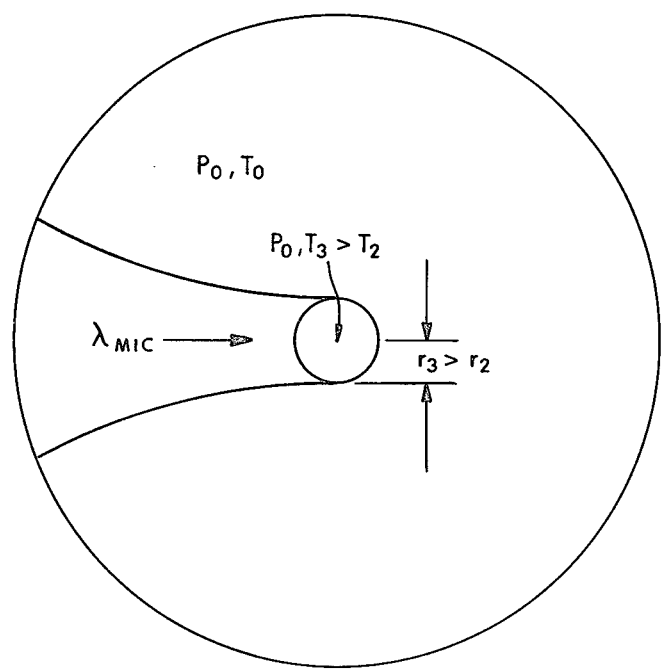

6. Keeping the supply laser wavelength at $\lambda_{FIR} = 1.22$ mm, increase its power level to 1.78 W. The remainder of this step is identical to Step 6 of Case I. (FIG. 13)

7. The result is identical to Step 7 of Case I.

THEORETICAL DEVELOPMENT

A Preliminary Thermodynamic Lemma.
Let $$\gamma_o = 7/5, \gamma_1 = 5/3 \tag{1}$$

denote, respectively, the ratios of specific heats of a diatomic gas and a fully ionized plasma. Consider N molecules in an initial volume $V_o$ at an initial temperature $T_o$ and initial pressure $p_o$, whence $$p_o = (N/V_o)kT_o \tag{2}$$

where k denotes Boltzmann's constant. Let a laser light pulse of energy $E_p$ be absorbed in $V_o$ at efficiency $\eta$ and let $\eta E_p$ be sufficient to dissociate the N molecules to atoms of atomic number Z and to fully ionize these atoms and to expand the plasma volume $V_o$ to a plasma volume $V_1$ at a temperature $T_1$. Then $$p_1 = p_o = \{2(1+Z)N/V_1\}kT_1. \tag{3}$$

Let $E_i$ denote the energy of molecular dissociation and ionization of the resultant two atoms. Then if $\Delta U$ denotes the change in internal energy $U = pV/(\gamma - 1)$ and if $\Delta V$ denotes the changes in volume V, we have by energy conservation $$\eta E_p = \Delta U + p_o \Delta V + NE_i, \tag{4}$$

where $$\Delta U = p_1 V_1/(\gamma_1 - 1) - p_o V_o/(\gamma_o - 1) = 2(1+Z)NkT_1/(\gamma_1 - 1) - NkT_o/(\gamma_o - 1) \tag{5}$$

and $$p_o \Delta V = p_o(V_1 - V_o) = p_1 V_1 - p_o V_o = 2(1+Z)NkT_1 - NkT_o, \tag{6}$$

whence, noting that $$(\gamma_1 - 1)^{-1} + 1 = \gamma_1/(\gamma_1 - 1) = \beta, \text{ say,} \tag{7a}$$

$$(\gamma_o - 1)^{-1} + 1 = \gamma_o/(\gamma_o - 1) = \gamma, \text{ say,} \tag{7b}$$

we find that $$\eta E_p = 2(1+Z)\beta NkT_1 - \gamma NkT_o + NE_i. \tag{7c}$$

Now, defining dimensionless quantities $$\kappa_i = E_i/kT_o, \tag{7d}$$

$$\theta = T_1/T_o, \tag{7e}$$

$$\alpha_p = E_p/NkT_o \tag{7f}$$

we find, finally, from (7c) the desired result $$\eta \alpha_p = [2(1+Z)\beta]\theta + (\kappa_i - \gamma). \tag{8}$$

Plan of Approach.

While hundreds of laser spark experiments have been reported (Bekefi[1], Hughes[2], Raizer[3], Ready[4]) there has not been reported any theoretical attempt to optimize the relationship between the ambient pressure, the pulsed energy, the spark focal spot radius, the supply laser wavelength, the plasma transparency, the bremmstrahlung loss, the supply laser power, and the pressure increase ratio. We shall reduce this problem to finding the unique positive root of a transcendental perturbation of an eight-degree polynomial in the ratio of the spark focal spot radius to the supply laser wavelength.

Configuration Design Optimization

We shall use MKS units. Let $\lambda_p$ denote the spark laser wavelength in meters and let $t_p$ denote the spark pulse duration in seconds. Let $p_o$ denote the ambient gas pressure in Pascals (Newt/m$^2$). Let $I_o$ denote the hydrogen gas ionization breakdown threshold intensity in W/m$^2$. Then if $t_p$ is sufficiently small (ten nanoseconds or less)

$$I_o = k_3/(\lambda_p)^2 p_o t_o, \quad k_3 = 1.49 J^2/m^3 \tag{9}$$

where the constant $k_3$ has been reported theoretically and experimentally in the references cited.

It is well known that the plasma resonant absorption frequency $$\nu = c/\lambda = k_2(N_{ec})^{\frac{1}{2}}, \quad k_2 = 8.98 \text{ sec}^{-1} m^{3/2} \tag{10}$$

where $c = 2.9979 \times 10^8$ m/sec and where $N_{ec}$ denotes the critical electron density $$N_{ec} = 2ZN/V \tag{11}$$

where V is the plasma volume formed by complete ionization of N original diatomic molecules of atomic number Z.

The plasma equation of state is $$p = (1 + Z^{-1})N_e kT, \quad k = 1.3807 \times 10^{-23} J/K \tag{12}$$

where $N_e$ is electron density (m$^{-3}$) and where T is temperature (°K.).

The plasma light transmissivity in an optical path of length l meters at frequency $\nu$ is $$\eta = 1 - e^{-K\nu l} \tag{13}$$

where (as measured in deuterium by Gunther[5])

$$K_\nu = k_4(N_3)^2/\nu^3(T)^{\frac{1}{2}}, \quad k_4 = 3.68 \times 10^{-2} m^5 k^{\frac{1}{2}}/\text{sec}^6. \tag{14}$$

The ionization potential of an H-atom is $$T_i = 13.6 \text{ eV} = 1.578 \times 10^{5\circ} \text{ K}. \tag{15}$$

For two atoms we have 27.2 eV and, using the dissociation-potential of 3.6 eV, we have for $H_2$ molecules $$E_i = 30.8 \text{ eV}; \tag{16}$$

hence, using standard atmospheric temperature $T_o = 288.2°$ K., $$\kappa_i = E_i/kT_o = 1.24 \times 10^3 \tag{17}$$

where we have used $E_1 = k(30.8)$ and converted $T_o$ to eV by dividing it by $e/k = 1.1604 \times 10^4$ K/eV. Next, by (1) and (7b), $$\gamma = 7/2 = 3.5 \tag{18}$$

whence $$\eta_i - \gamma = 1.237 \times 10^3 \tag{19}$$

and, by (1) and (7a), $$\beta = 5/2 = 2.5. \tag{20}$$

Let $T_1$ denote the temperature of the fireball after the pulse, let $\theta = T_1/T_o$, let $r_o$ denote the spark laser focal radius, and let $E_p$ denote the total pulse energy and $\eta_e$ its absorption efficiency then the pulse intensity (assuming a uniform pulse shape of duration $t_p$) is $$I_o = E_p/\pi r_o^2 t_p, \tag{21}$$

and, by (8), $$\theta = \frac{\{\eta_p \alpha_p - (\kappa_i - \gamma)\}}{2(1+Z)\beta} \tag{22}$$

where, by hypothesis, the initially ionized volume is a cylinder of radius $r_o$ and length $l = \zeta r_o$ and where the final plasma volume is a sphere of radius $r_1$. Now, by design, choose $$r_1 = \lambda_{FIR}. \tag{23}$$

Then, by definition of the unknown x, $$r_o = x\lambda_{FIR}, \quad x = r_o/r_1 \tag{24}$$

we have $$V_o = \pi\zeta r_o^3 = \pi\zeta\lambda_{FIR}^3 x^3, \tag{25}$$

$$V_1 = (4/3)\pi\lambda_{FIR}^3. \tag{26}$$

The initial pressure $p_o$ is given by (2) and also by (3), whence $$p_o = (N/V_o)kT_o = NkT_o/\pi\zeta\lambda_{FIR}^3 x^3 \tag{27}$$

and the critical resonant absorption density for $\lambda_{FIR}$ is, by (10), $$N_{ec} = 2ZN/V_1 = 3ZN/2\pi\lambda_{FIR}^3 = (c/k_2\lambda_{FIR})^2 \tag{28}$$

whence, combining (2), (3), (27), and (28), we find that $$N = (2\pi\lambda_{FIR}/3Z)(c/k_2)^2 = [\pi\zeta\lambda_{FIR}^3 p_o/kT_o]x^3 \tag{29}$$

which gives N in terms of $\lambda_{FIR}$ and also gives $$p_o x^3 = [2kT_o/3Z\zeta\lambda_{FIR})^2](c/k_2)^2. \tag{30}$$

For later convenience, (29) and (30) yield $$NkT_o = \pi\zeta\lambda_{FIR}^3 p_o x^3 = (2\pi\lambda_{FIR}kT_o/3Z)(c/k_2)^2. \tag{31}$$

Now, from (7f), (21), (9), and (31), $$\begin{aligned}\alpha_p &= E_p/NkT_o = I_o \pi r_o^2 t_p/NkT_o \\ &= k_3 \pi r_o^2 t_p/(\lambda_p^2 t_p p_o NkT_o) = k_3 \pi \\ &\lambda_{FIR}^2 x^5/(\lambda_p^2 p_o x^3 NkT_o) = \\ &\epsilon_p x^5\end{aligned} \tag{32}$$

where $$\epsilon_p = [9Z^2\zeta k_3\lambda_{FIR}^3/4\lambda_p^2(kT_o)^2](k_2/c)^4. \tag{33}$$

Next, write (2)—(3) as $$p_o = NkT_o/V_o = 2(1+Z)NkT_1/V_1 \tag{34}$$

whence, by (25)—(26), $$\theta = T_1/T_o = V_1/2(1+Z)V_o = 2/3\zeta(1+Z)x^3 \tag{35}$$

so that, by (22) and (32), we have, finally, $$\eta_p \epsilon_p x^8 - (\kappa_i - \gamma)x^3 - (4\beta/3\zeta) = 0. \tag{36}$$

It remains only to express $\eta_p$ in terms of x before solving (36). From (14), (11) and (25), $$K_\nu = [k_4/(c/\lambda_p)^3 (T_i)^{\frac{1}{2}}]\{2ZN/\pi\zeta\lambda_{FIR}^3 x^3\}^2 \tag{37}$$

whence $$K_\nu 1 T = K_\nu \zeta r_o = k_5/x^5, \tag{38}$$

where $$k_5 = [k_4/\zeta T_i^{\frac{1}{2}}\lambda_{FIR}^5](2ZN/\pi)^2(\lambda_p/c)^3. \tag{39}$$

Hence the pulse absorption efficiency $\eta_p$ is $$\eta_p = 1 - e^{-k_5/x^5}. \tag{40}$$

Therefore the unknown x is determined by $$(1 - e^{-k_5/x^5})\epsilon_p x^8 - (\kappa_i - \gamma)x^3 - (4\beta/3\zeta) = 0. \tag{41}$$

To solve (41), rearrange and solve iteratively by $$x_* = \lim x_m, \quad (m = 1, 2, 3, \ldots) \tag{42}$$

$$x_{m+1} = \{[k_6 + k_7(x_m)^3]/[1 - e^{-k_5/(x_m)^5}]\}^{\frac{1}{8}}, \tag{43}$$

$$k_6 = (4\beta/3\zeta)/\epsilon_p, \quad k_7 = (\kappa_i - \gamma)/\epsilon_p. \tag{44}$$

Then the remaining unknowns are determined by $$r_o = x_* \lambda_{FIR}, \tag{45}$$

$$\theta = \tfrac{2}{3}\zeta(1+Z)x_*^3 \tag{46}$$

$$T_1 = \theta T_o \tag{47}$$

$$p_o = [2kT_o/3Z\zeta\lambda_{FIR}^2](c/k_2)^2/x_*^3 \tag{48}$$

$$E_p = k_3\pi r_o^2/\lambda_p^2 p_o. \tag{49}$$

For comparison with $r_o$ and $r_1$, the Debye length $\lambda_D$ is given by $$\lambda_D = k_8(T/N_e)^{\frac{1}{2}}, \quad k_8 = 69.0 \ m^{-\frac{1}{2}}k^{-\frac{1}{2}} \tag{50}$$

or, using (12) with $Z=1$, $$\lambda_D = k_9 T/p^{\frac{1}{2}}, \quad k_9 = 3.63 \times 10^{-10} \ Newt^{\frac{1}{2}}/K. \tag{51}$$

Now let $T_3$ be prespecified, and let $\xi$ be unknown, where $$0 < \xi < 1 \tag{52}$$

and where, by definition, $$r_3 = r_1/\xi = \lambda_{FIR}/\xi \tag{53}$$

whence $$V_3 = V_1/\xi^3, \quad N_{e3} = \xi^3 N_{e1}. \tag{54}$$

Also, clearly, $$p_2 = (1+Z^{-1})N_{e1}kT_2 = p_3 = (1+Z^{-1})N_{e3}kT_3 \tag{55}$$

whence $$\xi^3 N_1 T_3 = N_{e3} T_3 = N_{e1} T_2 \tag{56}$$

and so $$T_2 = \xi^3 T_3. \tag{57}$$

Now take $\nu = \nu_{FIR} = \nu_{mic}$ to be the frequency of the microwave and find from (14) that $$K_\nu = k_{10}\xi^6, \tag{58}$$

where $$k_{10} = k_4 N_{e1}^2/(c/\lambda_{FIR})^3 (T_3)^{\frac{1}{2}}. \tag{59}$$

Hence the transparency to the microwave is defined by the absorption efficiency factor $$\eta_{mic} = 1 - e^{-K_\nu(2r_3)} = 1 - e^{-2k_{10}\lambda_{FIR}\xi^5} \tag{60}$$

and so $$\xi = \{[\log(1-\eta_{mic})^{-1}]/2k_{10}\lambda_{FIR}\}^{1/5}. \tag{61}$$

Next $$p_2/p_o = p_2/p_1 = 2(1+Z)NkT_2/2(1+Z)NkT_1 = T_2/T_1$$
$$= \xi^3(T_3/T_1), \tag{62}$$

whence, finally, $$p_2 = \xi^3(T_3/T_1)p_o. \tag{63}$$

It is easy to see that the bremmstahlung loss decreases during the final expansion. It is well known that this power $P_{brem}$ in Watts is given by $$P_{brem,1} = CN_{e1}^2 T_2^{\frac{1}{2}} V_1, \tag{64}$$

where, if $T_2$ is expressed in keV, $C = 5.354 \times 10^{-37} wm^3/k^{\frac{1}{2}}$. Now $$P_{brem,2} = CN_{e3}^2 T_3^{\frac{1}{2}} V_3 = CN_{e1}\xi^3)^2 (T_2/\xi^3)^{\frac{1}{2}}$$
$$(V_1/\xi^3) = \xi^{3/2} P_{brem,1} < P_{brem,1} \text{ by (52)}. \tag{65}$$

To find $\xi$, assume transparency to the microwave defined by the absorption efficiency factor $$\eta_{mic} = 10^{-3} = 0.001, \tag{66}$$

and use (61). To find x, assume that $$\zeta = 10 \tag{67}$$

which agrees well with numerous measured experiments and is satisfactorily accurate for preliminary design by virtue of the fact that the solution of (41) is not very sensitive to variations of $\zeta$ around the nominal value (67).

The microwave power $P_{mic}$ can be found from $\eta_{mic}P_{mic} = P_{brem,2}$, i.e., by (65), $$P_{mic} = P_{brem,1}\xi^{3/2}/\eta_{mic}. \tag{68}$$

Numerical Example.
Taking $Z=1$, $\zeta=10$, and assuming $$\lambda_p = 1.06 \times 10^{-6} m, \quad \lambda_{FIR} = 1.22 \times 10^{-3} m \tag{69}$$

we find, readily, from the preceding theory $$k_5 = 5.03 \times 10^{-10}, \tag{70}$$

$$\epsilon_p = 2.73 \times 10^{15}, \tag{71}$$

$$k_6 = 1.22 \times 10^{-16}, \tag{72}$$

$$k_7 = 4.52 \times 10^{-13}. \tag{73}$$

Then, taking $$x_1 = 1.0 \times 10^{-2} \tag{74}$$

as the first iterate in (41), we find that convergence occurs in $m=5$ iterations, i.e., $x_4 = x\chi_5 = 1.027 \times 10^{-2}$. Hence $$x_* = 1.03 \times 10^{-2}, \tag{75}$$

which yields immediately $$r_o = 12.50 \ \mu m, \tag{76}$$

$$\theta = 3.077 \times 10^4, \tag{77}$$

$$T_1 = 8.87 \times 10^{6\circ} \ K. = 764.5 \ eV, \tag{78}$$

$$V_1 = 7.55 \times 10^{-9} m^{-3}, \tag{79}$$

$$N_{e1} = 7.53 \times 10^{20} m^{-3}, \tag{80}$$

$$\nu_{c1} = 246.3 \ GHz, \tag{81}$$

$$p_o = 1.819 \ atm = 1.843 \times 10^5 \ Pa, \tag{82}$$

$$E_p = 3.53 \ mJ, \quad \eta_p = 0.9878. \tag{83}$$

Next, using $T_3 = 130 \ keV = 1.5085 \times 10^9$ we find from (59), (66) and (61) that $$k_{10}=35.989 \ m^{-1}, \ 2k_{10}\lambda_{FIR}=8.76\times10^{-2}, \tag{84}$$

$$\xi=0.4088, \tag{85}$$

whence, finally $$r_3=2.98\times10^{-3} m, \tag{86}$$

$$T_2=1.031\times10^{8\circ} \ K.=8.88 \ keV, \tag{87}$$

$$p_2=21.14 \ atm, \tag{88}$$

$$V_3=1.105\times10^{-7} \ m^3, \tag{89}$$

$$P_{brem}/V_1=9.01\times10^5 \ w/m^3. \tag{90}$$

$$P_{brem}=6.80 \ mW. \tag{91}$$

This concludes the Isochoric Heating example. The Isobaric Heating Example is found similarly, mutatis mutandis, by self-evident rearrangement of the formulae used in computing the first example.

REFERENCES

1. G. Bekefi (ed.), *Principles of Laser Plasmas*, Wiley-Interscience (1976).
2. T. P. Hughes, *Plasmas and Laser Light*, Adam Hilger (1975), 190.
3. Yu. P. Raizer, *Laser-Induced Discharge Phenomena*, Consultants Bureau (1977); Russian original Nauka Press (1974).
4. J. F. Ready, *Effects of High-Power Laser Radiation*, Academic Press (1971).
5. A. H. Guenther and W. K. Pendleton, "Laser-Produced Deuterium Plasmas", *Laser Interaction*, vol. 2, Plenum Press (1972), pp. 97–145.

DETAILED DESCRIPTION OF THE PREFERRED EMBODIMENTS

It will be assumed now that the reader is familiar with the NOMENCLATURE FOR DRAWINGS given above, and therefore details mentioned in the list of said nomenclature will not be repeated. It will also be assumed that the reader is familiar with the theoretical principles underlying the operability of this invention as disclosed above in the derivation of a set of parameters of a complete operative embodiment of the present invention.

Referring to the above-listed nomenclature, FIG. 1 is fairly self-explanatory. A reservoir 5 of ambient fluid 20, such as a hydrogenic gas (e.g. deuterium) is introduced at will via a feed-line 6, a value 7, and a nozzle 8 into a pressure vessel 10. This subsystem is so arranged that the fluid may be injected slowly and in a manner creating minimal turbulence, by means of turbulence-suppression means 9.

Subsequently a plasma fireball 31 will be generated in the center of vessel 10; this fireball will have lower density than the ambient fluid and will therefore tend to rise upward like a lighter-than-air "bubble". However, a stream of ambient fluid 12 will be so directed as to maintain the "bubble" in its central position. This may be done in various ways. For example, if vessel 10 were cylindrical rather than spherical, the ambient medium could be swirled around the horizontal centerline in a cylindrical blanket formation, tending to maintain the bubble along the centerline as in the experiments of Kapitza and his collaborators. Alternatively, a nozzle or nozzles may be used to inject a vertical downdraft at a speed determined by Stokes' Law to be just sufficient, by viscous friction, to maintain the "bubble" in the center and prevent it from rising by its natural buoyancy.

In the preferred embodiment, the ambient fluid 20 is a hydrogenic gas. A small cylindrical target volume 30 is selected to be ionized by means of a spark laser system 57 including a pulsed laser 55 and suitable laser-light transparent ports 45; the spark-laser light beam 53 is focused by means of a spherical mirror 54 and the focal spot is chosen to be so small that the corresponding intensity of laser light exceeds the ionization threshold of the ambient gas under the initial conditions of temperature and pressure. The target mass becomes fully ionized and, after termination of the spark laser pulse, it cools and expands until it reaches pressure equilibrium with the ambient, thereby creating a fireball 31.

Prior to initiation of the laser spark, a steady-state supply laser system 50 has been focused on the target mass and used to irradiate the target mass with a laser light beam 40; this beam emanates from a supply laser or lasers 47 and enters the vessel 10 through suitably transparent ports 45.

The expansion 60 of mass 30 takes place within the focal spot of lasers 47 and is so designed that as the fully ionized target plasma 31 reaches its equilibrium conditions, the density of plasma 31 is exactly equal to the resonant absorption density of the wavelength of beam 40; therefore, the plasma 31 absorbs energy from the system 50 which compensates for the loss of energy by bremmstrahlung radiation.

The preceding processes and conditions are so selected as to produce a steady-state fireball 31, as in the experiments of Bekefi et al and of Raizer et al; several hundred such experiments have been published, with pressures ranging from fractions of an atmosphere to thousand of atmospheres. In the case of the so-called "optional plasmotron" of Raizer et al, the fireball could be maintained in a steady-state indefinitely by means of "supply lasers" after its initial creation by "spark lasers".

The experiments of Kapitza et al have demonstrated that very similar results can be obtained by means of microwaves rather than laser beams. In the Kapitza experiments, cylindrical plasmas measuring tens of centimeters have been maintained at temperatures of tens of millions of degrees Kelvin indefinitely, with a boundary layer between the plasma and the ambient medium measured to have a near-discontinuity in temperature (millions of degrees Kelvin) taking place in a layer measured in millimeters.

Figure 2:
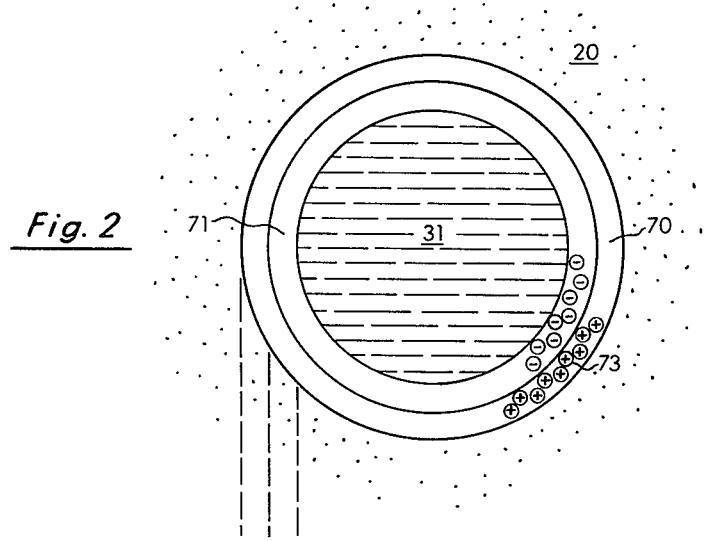
FIG. 2 is an expanded cross-section of the central portion of FIG. 1, illustrating one of the important micro-physical principles upon which the operability of the invention is based; although only one pair of so-called BGK waves is illustrated, there could be a plurality of them (e.g. of radially decreasing amplitude).
Figure 3:
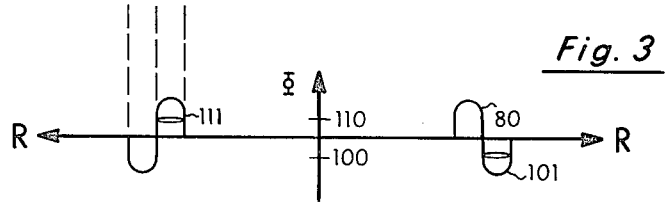
FIG. 3 is a graph of assistance in explaining the theoretical principles underlying the operability of this invention, drawn to the same (exaggerated) scale as FIG. 2, and applying to FIG. 2.

The true physical explanation of the near-perfect reflectivity of the boundary layer for particles of either sign (which eluded Kapitza) is presented in FIGS. 2 and 3.

The temperature discontinuity takes place in a boundary layer 70 which comprises at least two sub-layers 71 and 73; one such layer contains an excess of positive charge, and the other such layer contains an excess of negative charge. A rigorous solution of the Boltzmann-Poisson equations found by Bernstein, Greene, and Kruskal (the BGK solutions) allows for trapped particles as shown in FIGS. 2 and 3. The electrostatic potential may be plotted radially as shown in FIG. 3, wherein the ordinates 80 denote potential $\Phi$. An ion 101 may be trapped in a "potential well" at a negative energy level 100; similarly, an electron 111 may be trapped in a "potential hill" at a positive energy level 110. Kapitza's attempted explanation of the phenomenon 70 included only the potential hills and explained the reflection of electrons, but did not explain the reflection of ions; in his earlier publications he postulated ion loss into the layer 70 and a hypothesized "anomalous skin current". In his Nobel Prize Acceptance Speech (published in Science, Sept. 7, 1979), Kapitza conjectured that the central ions were somehow contained, with no clear explanation of the mechanism, but this inadequacy of interpretation of the phenomenon 70 prevented him from attaining his goal of understanding how to design an extrapolation in increase of temperature by a factor of 20, which is the principal achievement of the presently disclosed invention.

In fact, with a correct theory of the phenomenon 70, it is possible to design a subtly-chosen interrelationship between the various physical parameters, as already explained above, which brings into feasibility the possibility of either isochoric heating or isobaric heating sufficient to increase the fireball's temperature by the desired remaining factor. In the case of isochoric heating, this is achieved by means of the sub-system 5,6,7,8,9 already explained, whereby the ambient gas pressure can be increased above its initial value while the volume of the fireball remains constant. In the case of isobaric heating, this desideratum is attained by means of tuning the frequency of the supply laser system 40, 45, 47, 50 while the pressure of the fireball remains constant. In either case the parameters of all of the sub-systems must be extremely carefully chosen according to the principles disclosed herein or there is no significant temperature increase during the final phase of operation of the system. The non-obviousness of the principles disclosed herein is made manifest by the fact that in his 1979 Novel Prize Acceptance Speech Kapitza mentioned having discovered the phenomenon 70 by accident in the 1950's, and having experimented with it from 1959 to 1969 with numerous collaborators and extensive laboratory facilities under his direction, and having tried systematically from 1969 to 1979 to find a way to increase the plasma's temperature by the final (but hitherto impossible) factor of twenty, but without success, and having concluded that only with the addition of a strong magnetic field (unnecessary in the present invention) and only with increasing the plasma's size to several meters (also quite unnecessary in the present invention, as demonstrated quantitatively above) could the objective be considered to be a rational goal, but one even so whose attainment would require much further invention and experimentation. Accordingly the present disclosure demonstrates how to obtain a useful result in the category of one which is internationally recognized as having been "long sought, seldeom approached, and never attained" and which therefore meets the statutory criteria of non-obviousness in the degree required for patentability.

It remains only to consider how to maintain the desired relatively low temperature of the ambient medium 20; numerous methods of accomplishing that objective are of course available from the public domain. For example, a cooling fluid medium 91 may be circulated in contact with vessel 10 by means of channels 90; alternatively, the ambient medium may be removed from vessel 10 by means of egress 93, cooled by system 95 (e.g. a heat-exchanger system of some sort) and returned to vessel 10 via ingress 97.

DETAILED DESCRIPTION OF THE OPERATION OF THE INVENTION

The operation of the above-described embodiments is illustrated in FIGS. 4–13. Perusal of the discussion of FIGS. 4–8 in the Isochoric Heating Example above, but with particular quantitative values of the parameters omitted, will provide a completely general description of one preferred mode of operation of the apparatus, method and process illustrated in FIGS. 1–3. Likewise perusal of the detailed description above of the Isobaric Heating Example in connection with FIGS. 9–13, but with omission of the particular parameter values specified there, will provide a completely general description of another preferred mode of operation of the present invention.

Of course, the invention may be embodied in other specific forms and operated in other specific modes without departing from its spirit or essential characteristics. The described embodiments and modalities are to be considered in all respects only as illustrative and not restrictive and the scope of the invention is, therefore, indicated by the appended claims rather than by the foregoing detailed descriptions. All changes which come within the meaning and range of equivalency of the claims are to be embraced within their scope.

What is claimed and desired to be secured by United States Letters Patent is:

1. An improved method of generation, insulated confinement and heating of plasmas, including the known steps of:
    (a) surrounding a target mass with an ambient fluid medium at a predetermined pressure;
    (b) projecting upon said target mass, to bring it to a predetermined temperature and to fully ionize it, pulsed energy selected from the class consisting essentially of pulsed photon energy or pulsed particle-beam kinetic energy; while
    (c) relying upon the spontaneous creation of an electrostatic double-layer between said ionized mass and said ambient medium to provide substantially complete thermal insulation of said ionized mass from energy losses by ordinary electron thermal conductivity, or convection, leaving the dominant energy loss from said ionized mass to be bremmstrahlung losses $P_{brem}$ predictable by $$P_{brem} = C(p^2/T^{3/2})((4/3)\pi r^3),$$

where p denotes pressure in atm and T denotes temperature in °K., and $$C = 2.12 \times 10^9 \, (°K.)^{3/2} \text{Watts/cm}^3$$

is a known plasma-physical constant;
    (d) compensating completely for said bremmstrahlung loss by supplying additional radiant energy to said ionized mass so as to maintain said temperature of said ionized mass at a substantially steady level; wherein
    (e) the frequency range of said additional radiant energy is so selected as to be absorbable by said ionized mass, namely $$(c/4)/r \leq \nu \leq D(rp^2/T^{5/2})^{\frac{1}{2}},$$

where r denotes the radius of said ionized mass in cm, where c denotes the speed of light in cm/sec, where p denotes the pressure of said ambient fluid medium in atm, where T denotes the temperature of said ionized mass in °K., where $\nu$ denotes the frequency of said additional radiant energy in Hertz, and where $D=2\times10^{18}$ is a constant; and (f) adjusting the power level of said additional radiant energy to maintain said ionized mass in a substantially steady state by just compensating for said ionized mass's power losses;

wherein the improvement comprises the subsequent additional steps of:

(g) increasing the static pressure of said ambient medium to a pressure greater than atmospheric, thereby, through the medium of the thermal-barrier double-layer, equally increasing the static pressure of said ionized mass, so as to enable said mass to absorb more of said radiant energy, thereby increasing said temperature of said ionized mass, but also increasing its power losses; while simultaneously (h) monitoring said radius r and said temperature T; and (i) increasing said power level of said radiant energy supply so as to compensate for said increased power losses during said temperature increase while maintaining said radius and hence said ionized mass's volume substantially constant during this subsequent stage of heating beyond said initial temperature.

2. The improved method of claim 1, wherein the improvement further comprises:

(j) halting said pressure increase but increasing said rate of power increase so as to compensate for the reduced efficiency of absorption by allowing increasing waste of said radiant energy supply, up to a limit of one-tenth of one percent absorption or substantial transparency of said ionized mass to said radiant energy supply, during which final heating stage, at constant pressure, said radius r will increase in direct proportion to the cube-root of said temperature of said ionized mass.

3. An improved method of generation, insulated confinement and heating of plasmas, including the known steps of:

(a) surrounding a target mass with an ambient fluid medium at a predetermined pressure;

(b) projecting upon said target mass, to bring it to a predetermined temperature and to fully ionize it, pulsed energy selected from the class consisting essentially of pulsed photon energy or pulsed particle beam kinetic energy; while (c) relying upon the spontaneous creation of an electrostatic double-layer between said ionized mass and said ambient medium to provide substantially complete thermal insulation of said ionized mass from energy losses by ordinary electron thermal conductivity, or convection, leaving the dominant energy loss from said ionized mass to be bremmstrahlung losses $P_{brem}$ predictable by $$P_{brem}=C(p^2/T^{3/2})((4/3)\pi r^3),$$

where p denotes pressure in atm and T denotes temperature in °K., and $$C=2.12\times10^9 \text{ (°K.)}^{3/2}\text{Watts/cm}^3$$

is a known plasma-physical constant;

(d) compensating completely for said bremmstrahlung loss by supplying additional radiant energy to said ionized mass so as to maintain said temperature of said ionized mass at a substantially steady level; wherein (e) the frequency range of said additional radiant energy is so selected as to be absorbable by said ionized mass, namely $$(c/4)/r \leq \nu \leq D(rp^2/T^{5/2})^{\frac{1}{2}},$$

where r denotes the radius of said ionized mass in cm, where c denotes the speed of light in cm/sec, where p denotes the pressure of said ambient fluid medium in atm, where T denotes the temperature of said ionized mass in °K., where $\nu$ denotes the frequency of said additional radiant energy in Hertz, and where $D=2\times10^{18}$ is a constant; and (f) adjusting the power level of said additional radiant energy to maintain said ionized mass in a substantially steady state by just compensating for said ionized mass's power losses;

wherein the improvement comprises the subsequent additional steps of:

(k) selecting said initial ambient fluid pressure to be greater than atmospheric and leaving it constant during the subsequent heating stage; and (l) monitoring said temperature T of said ionized mass; and (m) decreasing said radiant energy supply's said power level so as to maintain said pressure substantially constant while allowing said temperature T to increase; while simultaneously (n) decreasing said frequency $\nu$ of said radiant energy supply in order to maintain it in a range absorbable by said ionized mass, namely the range cited in step (e), which will require reduction of said frequency in inverse proportion to the $(5/6)^{th}$ power of said temperature during said temperature increase.

4. The improved method of claim 1, wherein the improvement further comprises:

(o) maximizing the temperature T of the initially ionized mass by selecting the focal-spot radius $r_o$ of said pulsed photon energy, the focal-spot radius r of said radiant energy supply, the initial pressure $p_o$ of said ambient fluid, and the initial energy $E_p$ of said pulsed photon energy, in terms of the selected wavelength $\lambda_p$ of said pulsed photon energy and of the selected wavelength $\lambda_{FIR}$ of said radiant energy supply, as follows:

$$r=\lambda_{FIR};$$

$$r_o=xr;$$

$$p_o=(2kT_o/3Z\zeta\lambda_{FIR}^2)(c/k_2)^2/x^3;$$

$$E_p=k_3\pi r_o^2/p_o\lambda_p^2;$$

wherein the MKS system of units is used; and where x is the unique positive solution of the implicit equation $$(1-\exp(-k_5/x^5))k_{11}x^8-k_{12}x^3-(\tfrac{1}{2})=0,$$

where Z denotes the atomic number of the ions, so that Z=1 for hydrogenic plasmas, where $$k_5=(k_4/10T_i^{\frac{1}{2}}\lambda_{FIR}^5)(2ZN/\pi)^2(\lambda_p/c)^3,$$

where $k_4=3.69\times10^{-2}$, where $T_i=1.58\times10^{5}$ °K., where $N=(2\pi\lambda_{FIR}/3Z)(c/k_2)^2,$ where $k_2=8.98$, where $k=1.3807\times10^{-23}$, where $k_{12}=1,237$, where $T_o=288.2°$ K., where $k_{11}=(90Z^2k_3\lambda_{FIR}^3/4\lambda_p^2(kT_o)^2)(k_2/c)^4,$ where $k_3=1.49$, where $\zeta=10$, where the wavelengths are in meters, as are the radii, where pressure is in Pascals, where energy is in Joules, and where the initial temperature T is predictable in terms of nominal room-temperature $T_o$ by $T=T_o/(15(1+Z)x^3).$ 5. The improved method of claim 3, wherein the improvement further comprises:
   (o) maximizing the temperature T of the initially ionized mass by selecting the focal-spot radius $r_o$ of said pulsed photon energy, the focal-spot radius r of said radiant energy supply, the initial pressure $p_o$ of said ambient fluid, and the initial energy $E_p$ of said pulsed photon energy, in terms of the selected wavelength $\lambda_p$ of said pulsed photon energy and of the selected wavelength $\lambda_{FIR}$ of said radiant energy supply, as follows:

$r=\lambda_{FIR};$ $r_o=xr;$ $p_o=(2kT_o/3Z\zeta\lambda_{FIR}^2)(c/k_2)^2/x^3;$ $E_p=k_3\pi r_o^2/p_o\lambda_p^2;$ wherein the MKS system of units is used; and where x is the unique positive solution of the implicit equation $(1-\exp(-k_5/x^5))k_{11}x^8-k_{12}x^3-(\frac{1}{8})=0,$ where Z denotes the atomic number of the ions, so that $Z=1$ for hydrogenic plasmas, where $k_5=(k_4/10T_i^{\frac{1}{2}}\lambda_{FIR}^5)(2ZN/\pi)^2(\lambda_p/c)^3,$ where $k_4=3.69\times10^{-2}$, where $T_i=1.58\times10^{5°}$ K., where $N=(2\pi\lambda_{FIR}/3Z)(c/k_2)^2,$ where $k_2=8.98$, where $k=1.3807\times10^{-23}$, where $k_{12}=1,237$, where $T_o=288.2°$ K., where $k_{11}=(90Z^2k_3\lambda_{FIR}^3/4\lambda_p^2(kT_o)^2)(k_2/c)^4,$ where $k_3=1.49$, where $\zeta=10$, where the wavelengths are in meters, as are the radii, where pressure is in Pascals, where energy is in Joules, and where the initial temperature T is predictable in terms of nominal room-temperature $T_o$ by $T=T_o/(15(1+Z)x^3).$

* * * * *